US012673442B2

(12) United States Patent
Moisel et al.

(10) Patent No.: US 12,673,442 B2
(45) Date of Patent: Jul. 7, 2026

(54) METHOD AND INSTALLATION FOR PRODUCING A FILM OR SHEET FROM A SLABSTOCK FOAM, AND METHOD AND SYSTEM FOR RETROFITTING AN INSTALLATION FOR FILM OR SHEET PRODUCTION

(71) Applicant: Albrecht Baumer GmbH & Co. KG Spezialmaschinenfabrik, Freudenberg (DE)

(72) Inventors: Christoph Moisel, Cologne (DE); Jan Horsthemke, Siegen (DE); Jörg Reinemann, Freudenberg (DE); Timon Georg, Burbach (DE); Andreas Eichenauer, Freudenberg (DE)

(73) Assignee: Albrecht Baumer GmbH & Co. KG Spezialmaschinenfabrik, Freudenberg (DE)

( * ) Notice: Subject to any disclaimer, the term of this patent is extended or adjusted under 35 U.S.C. 154(b) by 510 days.

(21) Appl. No.: 18/580,130

(22) PCT Filed: Feb. 22, 2022

(86) PCT No.: PCT/EP2022/054417
§ 371 (c)(1),
(2) Date: Jan. 17, 2024

(87) PCT Pub. No.: WO2022/180044
PCT Pub. Date: Sep. 1, 2022

(65) Prior Publication Data

US 2024/0198554 A1 Jun. 20, 2024

(30) Foreign Application Priority Data

Feb. 23, 2021 (DE) ..................... 10 2021 104 239.9

(51) Int. Cl.
*G06F 17/00* (2019.01)
*B26D 3/00* (2006.01)
(Continued)

(52) U.S. Cl.
CPC ............... *B26D 3/28* (2013.01); *B26D 3/006* (2013.01); *B26D 5/00* (2013.01); *B26D 7/30* (2013.01);
(Continued)

(58) Field of Classification Search
CPC .......... B65H 2511/112; B65H 2220/01; B65H 2513/11; B65H 2220/02; B65H 23/198;
(Continued)

(56) References Cited

U.S. PATENT DOCUMENTS 12,157,259 B2 * 12/2024 Golubski ................ B29C 48/92
2005/0247220 A1 * 11/2005 Brandenburg ..... B65H 23/1882 101/226
(Continued)

FOREIGN PATENT DOCUMENTS

AT 203204 5/1959
DE 10306607 11/2003
(Continued)

OTHER PUBLICATIONS

Film slitting machine winding skills sharing—Delish Machine (Year: 2024).*
(Continued)

*Primary Examiner* — Ronnie M Mancho
(74) *Attorney, Agent, or Firm* — Foley IP Law, PLLC

(57) ABSTRACT

The invention relates to a method for producing a film (2) or sheet from a block material, in particular from a slabstock foam (3), in which at least the following regions are provided, as seen in a production direction (P) of the film (2) or
(Continued)

Figure 1:
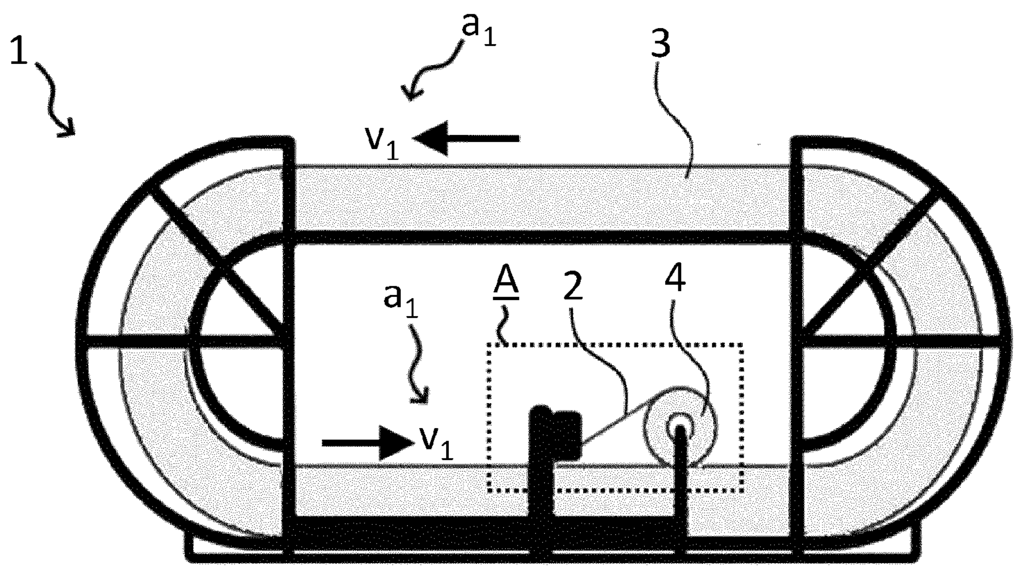

sheet: a cutting region (I) for cutting the film (2) or sheet, wherein the film (2) or sheet is cut out, in a slitting-open manner, by means of a cutting unit (10) from the block material, which is continuously fed to the cutting region (I); also a passing-on region (II), adjoining the cutting region (I) and having a driven passing-on roller (20) for conveying the film (2) or sheet out of the cutting region (I); and also a secondary region (III'), adjoining the passing-on region (II) and intended for further processing the film (2) or sheet, in particular a winding region (III) for winding the film (2) or sheet into a coil (4). In this case, there is a cutting-region stress in the film (2) or sheet in the cutting region (I) upstream of the passing-on roller (20), and there is a secondary stress in the film (2) or sheet in the passing-on region (II) upstream of the secondary region (III'), in particular winding region (III). The invention also relates to an installation (1) for film or sheet production, and to a method for retrofitting an installation (1) for film or sheet production, and to a system for retrofitting an installation for film or sheet production.

15 Claims, 3 Drawing Sheets

(51) Int. Cl.

| | |
|---|---|
| ***B26D 3/28*** | (2006.01) |
| ***B26D 5/00*** | (2006.01) |
| ***B26D 7/30*** | (2006.01) |
| ***B65H 23/198*** | (2006.01) |

(52) U.S. Cl.
CPC ........ *B65H 23/198* (2013.01); *B65H 2511/13* (2013.01); *B65H 2513/11* (2013.01)

(58) Field of Classification Search
CPC ...... B65H 2511/13; B65H 2301/41374; B65H 2553/414; B26D 3/28; B26D 3/006; B26D 5/00; B26D 7/30
USPC .......................................................... 700/150
See application file for complete search history.

(56) References Cited

U.S. PATENT DOCUMENTS

| | | | | |
|---|---|---|---|---|
| 2012/0043026 | A1 | 2/2012 | Tillmann et al. | |
| 2013/0199347 | A1* | 8/2013 | Tillmann | B26D 5/086 83/13 |
| 2024/0083083 | A1* | 3/2024 | Golubski | B29C 48/92 |
| 2024/0198554 | A1* | 6/2024 | Moisel | B26D 3/28 |

FOREIGN PATENT DOCUMENTS

| | | | | | |
|---|---|---|---|---|---|
| DE | 102006027271 | | | 12/2007 | |
| DE | 10306607 | B4 | * | 3/2008 | B29C 51/46 |
| DE | 102011014707 | | | 9/2012 | |
| DE | 102021104239 | A1 | * | 8/2022 | B65H 23/198 |
| DE | 102021125645 | A1 | * | 4/2023 | E04F 19/064 |
| EP | 4237214 | B1 | * | 12/2025 | B65H 23/198 |
| FR | 1193245 | | | 10/1959 | |
| GB | 2438969 | A | * | 12/2007 | B27L 5/02 |
| JP | 2012024941 | A | * | 2/2012 | |
| JP | 6594440 | B2 | * | 10/2019 | B23K 26/03 |
| WO | WO 93/07327 | | | 4/1993 | |
| WO | WO-2022180044 | A1 | * | 9/2022 | B65H 23/198 |

OTHER PUBLICATIONS

Van Aubel, Ronan, “International Search Report & Written Opinion”, International Application No. PCT/EP2022/054417, mailed Jun. 14, 2022, 12 pages.

* cited by examiner

METHOD AND INSTALLATION FOR PRODUCING A FILM OR SHEET FROM A SLABSTOCK FOAM, AND METHOD AND SYSTEM FOR RETROFITTING AN INSTALLATION FOR FILM OR SHEET PRODUCTION

The present invention relates to a method for producing a film or sheet from a block material according to the preamble of claim 1. The invention further relates to an installation for producing a film or sheet from a block material according to the preamble of claim 9. Furthermore, the invention relates to a method for retrofitting an installation for producing a film or sheet from a block material according to the preamble of claim 14. Finally, the invention also relates to a system for retrofitting an installation for producing a film or sheet from a block material according to the preamble of claim 15.

Installations as well as corresponding methods for operating such installations, which serve to produce films or also sheets from a generally soft block material, are in principle known from the prior art. However, the present invention allows for an improvement with regard to the automation of the known installations or methods.

This is explained below using the example of film production from a slabstock foam. In such a film production process, as is already known in principle from the prior art, a slabstock foam, which is formed as a continuous block—usually glued together—is continuously guided, for example in a circulating manner, in an installation. Alternatively, a block that is not glued together can also be guided in an installation. During circulation, the block material is guided past a cutting unit, such as a cutting wedge or a cutter bar, whereby an upper layer of the slabstock foam is cut or split off. This separated upper layer represents the product in the form of the foam film and, for example, can be wound into a coil of the foam film, as seen downstream in the process. In the aforementioned alternative example of a non-glued block, the resulting coil length of the cut film is then at maximum the total block length of the block material, since multiple passes are not carried out in succession and thus cut into a continuous film, as is the case with a glued block. In particular with larger cutting thicknesses, thus, resulting thicknesses of the cut film from about 20 mm, block material that is not glued together is also used more frequently. However, the present invention is not intended to be limited to the application of winding a cut film into a coil. It is also conceivable that a block material other than a foam material is cut, or that the cut material is not wound into a coil but is processed further in some other way. It is also conceivable that the cut film is fed out of the installation for further processing elsewhere, or that the cut material is cut directly into smaller elements which—depending on their thickness—are more likely to be regarded as sheets than as film. In the present case, on the one hand, the patent application refers to a sheet in relation to the end product of a material cut out of the block material, both initially in terms of thickness and subsequently in terms of the length of the separated sheet element cut into a separated sheet. On the other hand, in the present case, the broad term "sheet" also refers to a material web that is cut slightly thicker compared with a typical film, or a cut material web made of slightly harder or stiffer material. Consequently, according to a broad understanding, a sheet is initially also to be understood, to a certain extent, as the endless material web of material cut, in a splitting-open manner, from the block material which has not yet been shortened to an individual length of a separate sheet element. In principle, a sheet present in the form of such a material web can also be wound into a coil or roll in a process section following the cutting process and then cut to size into individual sheet elements in later steps, for example on other installations.

In the installations or methods known from the prior art for producing a film from a slabstock foam, the slabstock foam material is regularly fed at a constant feed rate to a cutting region for cutting the film. A cutting unit splits the material block at its surface in a desired thickness. As a result, the foam film of the desired thickness is created, which must be removed from the cutting region. On the one hand, the continuous feed of the circulating slabstock foam helps to push the foam film further forward and out of the cutting region as seen in the production direction. On the other hand, a passing-on region is provided which adjoins the cutting region as seen in the production direction and which can have a driven passing-on roller. This passing-on roller can thus be used to convey the cut film out of the cutting region arranged upstream in the process.

A further secondary region is regularly provided downstream of this passing-on region as seen in the production direction. Such a secondary region is basically used for further processing of the cut film to be discharged. For example, the secondary region can be a winding region in which the film is wound into a so-called coil, i.e. a wound roll of film.

Both the installations for producing the foam films and the corresponding production methods from the prior art pose a challenge in terms of setting the many process parameters that control production. Various process parameters, such as the drive parameters of the circulating foam material, for example the feed rate, or also the drive parameters such as the feed rate or drive torque of the driven roller controlling the winding process, have to be set. Each of these process parameters has an influence on the film produced and the quality thereof or, for example, on the quality of the wound coil of foam film. For example, specific requirements for the film to be produced include that it has a uniform thickness and uniform quality. In addition, the material web of the foam film should not have any cracks. Furthermore, once the film has been cut into a material web, its properties should not be negatively affected by the subsequent process steps, such as feeding the film out of the cutting region or winding the film into a coil in the winding region.

In order to meet these requirements, the current prior art regularly requires the installations to be operated by experienced operators. For example, the cut material web is often checked manually or by visual inspection by experienced system operators and, if defects are detected, individual process parameters are adjusted by the system operator. The disadvantage of this is, for example, that the continuous process—which ideally should not be stopped until the block material to be cut is completely used up and then changed—requires permanent supervision by experienced system operators. This leads to high personnel cost and associated production costs. In addition, the production methods and installations are more prone to errors, as the different levels of experience of the system operators often mean that the film produced no longer has the same uniform quality after a shift change from a more experienced to a less experienced employee due to a lack of adequate adjustment. Previous attempts to automate the process have so far failed because they are usually still too dependent on the adjustment of an experienced system operator. In particular, previous approaches are mainly such that manual re-adjustments have to be made after each change in cut thickness of the cut film.

It is therefore an object of the present invention to remedy this situation and to avoid the disadvantages described. More specifically, it is an object of the invention to configure the known method for producing a film or sheet from a block material in a more cost-effective and less error-prone manner. Another object is to configure the known installation for producing a film or sheet from a block material in a more cost-effective and less error-prone manner. Furthermore, it is an object of the invention to provide a method for retrofitting known installations for producing a film or sheet from a block material, whereby the operating costs can be reduced and the production can be configured to be less error-prone. Finally, it is an object to provide a system for retrofitting an installation for producing a film or sheet from a block material, with which the installations can be improved in terms of operating costs and error-proneness.

The object is achieved with regard to the production method by a method with the features of the characterizing part of claim 1. With regard to the installation, the object is achieved by an installation for producing a film or sheet from a block material with the features of the characterizing part of claim 9. With regard to the method for retrofitting an installation, the object is achieved by a method with the features of the characterizing part of claim 14. With regard to the system, the object is achieved by a system for retrofitting an installation for producing a film or sheet from a block material with the features of the characterizing part of claim 15.

Substantial for the invention is the knowledge that the described disadvantages of the prior art can be avoided by the fact that the load on the material web can be detected in a targeted machine-based manner and automatically in the different sections, and based thereon, the global process parameters can be controlled. This does interfere with the existing process in the known installations for film and sheet production, which is accompanied by increased expenditure. However, this makes the overall process more stable due to the more uniform quality of the films and sheets produced. The present invention allows automatic control of the process parameters that determine the production process of the films or sheets, which reduces operating costs due to lower personnel costs and increases process reliability due to less frequent variations in thickness or quality in the product. Automatic detection of the parameters is therefore carried out automatically in such a manner that the corresponding parameters are detected in a machine-based manner. The detection takes place independently of the operation by an experienced system technician. Furthermore, the automatic detection is in particular such that the automatic detection is substantially independent of the film material and film thickness. Accordingly, a system operator does not have to individually adjust the detection of the parameters after a change in the material of the cut film or after a change in the cut thickness by a few millimeters, for example. The automatic detection continues to be done in a machine-based manner.

In the method according to the proposal for producing a film or sheet from a block material, which can be in particular a method for producing a film or sheet from a slabstock foam, at least the following regions are provided as seen in a production direction of the film or sheet:

a cutting region for cutting the film or sheet, a passing-on region adjoining the cutting region, and a secondary region adjoining the passing-on region and intended for further processing of the film or sheet, which can in particular be a winding region for winding the film into a coil.

According to the proposal, the film or sheet is cut in the cutting region by means of a cutting unit from the block material, which is continuously fed to the cutting region, wherein the cutting unit can in particular be a cutter bar or a cutting wedge. Accordingly, the cutting of the film or sheet in the cutting region is to be understood to mean that the block material is split in a thickness direction transverse to the conveying direction. This is not to be understood to mean that the block material or the film split off therefrom is cut into individual elements with respect to their length as seen in the conveying direction.

According to the proposal, a driven passing-on roller is provided in the passing-on region for conveying the film or sheet out of the cutting region. In particular, the driven passing-on roller can have an outer contact surface with a relatively high coefficient of friction, so that the influence of the process taking place upstream of the passing-on roller on the sub-process downstream of the driven passing-on roller can be greatly reduced. The driven passing-on roller achieves a separation of the cutting process, which takes place upstream in relation to the production direction, and the secondary process, for example the winding process taking place downstream. In particular, a coefficient of friction of at least 0.4, preferably greater than 0.5, more preferably greater than 1.0, particularly preferably greater than 2.0, can be provided. For this purpose, the driven passing-on roller can have a coating on the surface to increase the coefficient of friction. The driven transfer roller is particularly preferably configured as a rubberized roller so that a desired high coefficient of friction is set.

The cutting region according to the proposal can in particular be understood to mean that it extends from the cutting unit to the driven passing-on roller, as seen in the production direction of the film or sheet. It is therefore substantially the region in which a thinner material web split off from the block material, for example in the form of a film, is present for the first time and this film is advanced in a substantially uninfluenced manner to the driven passing-on roller. In the cutting region, there is a cutting-region stress in the film or sheet upstream the passing-on roller.

The passing-on region according to the proposal can be understood in particular in such a manner that, as seen in the production direction of the film or sheet, it extends from the driven passing-on roller to a subsequent drive unit of the adjoining secondary region, for example to a driven winding roller (winding belt) in a winding region. The secondary region according to the proposal in turn can be understood in particular in such a manner that it adjoins the passing-on region as seen in the production direction of the film or sheet and extends, for example, starting from a driven winding roller (winding belt). In the passing-on region, there is a secondary stress in the film or sheet upstream of the secondary region. In particular, the cutting-region stress and the secondary stress in the film or sheet differ from each other due to the separation of the process by the driven passing-on roller arranged therebetween.

The method according to the proposal for producing the film or sheet from the block material is characterized in that the method is at least partially controlled in such a manner that:

(a) at least one parameter representing the cutting-region stress is automatically detected in the cutting region, and/or (b) at least one parameter representing the winding-region stress is automatically detected in the passing-on area.

In this manner, the production method can advantageously run in a reliable manner, even if no experienced system operator is observing the process. Advantageously, there is no need for an operator to draw conclusions about the stress values prevailing in the film by personally visually or even manually checking the material web that has been split off from the material block and transported through the installation.

The method according to the proposal for producing the film or sheet from the block material is further characterized in that at least one of the following process parameters is controlled on the basis of at least one of the parameters detected in step a) or b), thus on the basis of the parameter(s) representing the cutting-region stress and/or the secondary stress:

a drive parameter of the block material, a drive parameter of the driven passing-on roller, and/or a drive parameter in the secondary region for moving the film or sheet for further processing of the film or sheet.

In this manner, the automatically detected stress values, thus, the load on the material web prevailing in the individual areas, are effectively used to control the process of producing the film or sheet. For example, if too high a load is detected on a cut film, a drive parameter of the central driven passing-on roller can be reduced, as a result of which the cut film is no longer pulled out of the cutting region as strongly. As a result, a negative influence such as a thickness variance in the film split off from the block material can be efficiently avoided.

In principle, the present invention has recognized that various drive parameters can be controlled automatically for this purpose. For example, the production process can be controlled via the feed rate of the block material fed to the cutting region. Furthermore, the drive torque or, particularly preferably, the circumferential speed of the driven passing-on roller can be considered as drive parameters of the driven passing-on roller to be controlled. The circumferential speed of the driven passing-on roller makes it particularly easy to control the feed rate of the material web in the passing-on region and thus to adjust the resulting load on the material web. Drive parameters of the secondary region, such as the winding region, when the film is wound into a coil in the secondary region, can also be used for control. The drive torque, but particularly preferably the circumferential speed of a driven winding roller or a driven winding belt can also be used to control the winding of the film or sheet into a coil.

In principle, a driven roller is to be understood to mean that it is actively driven via a drive unit. Thus, a drive torque is applied, which causes the driven roller to rotate and effects a generally constant circumferential speed on the circumferential surface of the roller. The film is passed on as a material web on this outer circumferential surface. In this respect, driven rollers are distinguished in the process from passive rollers, which only serve to deflect or as a kind of roller for the passive forwarding of the material web.

The automated regulation of the various process parameters can be carried out according to the invention by automatically regulating and controlling only a single one of the exemplary process parameters, or preferably also by automatically regulating multiple process parameters. The present invention has recognized the advantages of actively intervening in the usual production process and automatically and mechanically detecting the prevailing stress in the material web or parameters representing this stress. This additional machine- or measurement-related effort has the advantage that the overall operating costs can be successfully reduced if the detected parameters are used to regulate the process parameters controlling the production process. For this purpose, for example, drive parameters such as the circumferential speed of the driven passing-on roller of the passing-on region are set in relation to the automatically detected parameter representing the cutting-region stress for the purpose of control. In an advantageous manner, the control of the production process by experienced system operators can be reduced considerably.

In principle, the thickness of the film or sheet cut or split from the block material can range from 0.8 mm to 200.0 mm. Preferably, the thickness of the cut film is between 1.5 mm and 30.0 mm. The preferred material for the block material is a foam, in particular flexible polyurethane (PUR) foam. Alternatively, it is also possible to provide harder porous/foamed materials as block material and cut them into films or sheets. For example, polyethylene (PE) or various rubber-like materials can also be used as block material.

Preferably, the feed rate of the block material, for example the circulating slabstock foam, can be between 50 m/min and 350 m/min, particularly preferably around 120 m/min.

In particular, it is advantageous if the method is regulated in such a manner that the cutting-region stress is considerably lower than the secondary stress in the film or sheet. Preferably, the ratio of cutting-region stress to secondary stress can be 0.75 or less, more preferably 0.5 or less, particularly preferably 0.25 or less. In this context, it is also possible to speak of a substantially stress-free state of the film or material web in the cutting region compared with the passing-on region. This advantageously ensures that the material web sags in the cutting region between the cutting unit and the passing-on roller, i.e. adjacent to the cutting wedge or cutter bar. In this manner, it is successfully prevented that the downstream components of the installation pull too strong on the cut film or sheet and thus negatively affect the uniform cut thickness of the film or sheet or, in general, the uniform quality of the product. In addition, material necking is successfully avoided, which can be caused, for example, by excessive stress in the cut film and thus cause an undesirable reduction in the film width or irregularities in the film width.

In principle, the present invention makes it advantageously possible to precisely control and also adjust the two stress regions, i.e. the cutting-region stress and the secondary stress. In principle, it is also conceivable that the ratio of cutting-region stress to secondary stress is 1:1. It is particularly advantageous if the cutting-region stress is substantially constant. In contrast, the secondary stress, which is usually higher, can vary more widely depending on the secondary process.

A first preferred embodiment of the method for producing the film or sheet (claim 2) is characterized in that, as a parameter representing the cutting-region stress, a sag of the film or sheet is automatically detected downstream of the cutting unit and upstream of the driven passing-on roller, as seen in the production direction of the film or sheet.

A further preferred embodiment of the method for producing the film or sheet (claim 4) is characterized in that as a parameter representing the secondary stress, a sag of the film or sheet is automatically detected downstream of the driven passing-on roller and upstream of the secondary region, in particular the winding region, as seen in the production direction of the film or sheet.

The sag of the film represents a qualitative measure, which is particularly easy to detect visually, of how high the cutting-region stress or secondary stress is, in particular whether it is too high, for example, and if the corresponding process parameters should be adjusted in order to reduce the corresponding stress.

A further preferred embodiment of the method for producing the film or sheet (claim 3) is characterized in that, as a parameter representing the cutting-region stress, a web stress in the film or sheet is automatically detected by means of a load cell unit downstream of the cutting unit and upstream of the driven passing-on roller, as viewed in the production direction of the film or sheet.

A further preferred embodiment of the method for producing the film or sheet (claim 5) is characterized in that, as a parameter representing the secondary tension, a web stress in the film or sheet is automatically detected by means of a load cell unit downstream of the driven passing-on roller and upstream of the secondary region, in particular the winding region, as viewed in the production direction of the film or sheet.

In this case, a load cell can precisely and numerically measure the parameter to be detected in the form of the cutting-region stress or secondary stress. The load cell preferably detects only the stress prevailing in the material web, thus in the cut film or sheet. In this manner, precise conclusions and exact control and adjustment of the production process are advantageously possible.

A further preferred embodiment of the method for producing the film or sheet (claim 6) is characterized in that the sag of the film or sheet is automatically detected by means of an optical measuring device. Here, the sag is preferably detected by means of a laser, more preferably by measuring to the surface of the film or sheet. In principle, lateral measurement is possible; however, measurement to the material web is preferably carried out from above so that the space available there can be advantageously utilized with regard to the installation of the measuring device.

A further preferred embodiment of the method for producing the film or sheet is characterized in that a thickness of the film or sheet is automatically detected in the cutting region. Preferably, the thickness of the film or sheet is automatically detected by means of an optical measuring device, preferably by means of a laser, more preferably by measuring to the surface of the film or sheet. In principle, lateral measurement is possible; however, measuring to the material web is preferably carried out from above so that the space available there can be advantageously utilized with regard to the installation of the measuring device. Measuring the thickness of the cut film provides another parameter that can be used to assess the quality of the film produced during the process. In this manner, a uniform quality of the produced film can be guaranteed.

A further preferred embodiment of the method for producing the film or sheet (claim 7) is characterized in that the mentioned process parameters are controlled in such a manner that:

- the drive parameter of the driven passing-on roller depends on the automatically detected sag of the film or sheet in the cutting region, and/or
- the drive parameter in the secondary region depends on the web stress in the film or sheet in the passing-on region, which is automatically detected by the load cell unit.

In particular, the circumferential speed of the driven passing-on roller and/or also the circumferential speed of a driven winding roller can advantageously be set directly as a function of the detected sag of the film or sheet in the cutting region or of the numerically detected web stress in the passing-on region.

In doing so, it is particularly advantageous if the circumferential speed of the driven passing-on roller is in the range from 98% to 110%, in particular 101% to 105%, of the feed rate of the block material. Furthermore, it is advantageous if the feed rate in the secondary region, or specifically as an example, the circumferential speed of the driven winding roller, is in the range of 95% to 115%, in particular 103% to 107%, of the feed rate of the block material. In this manner, a simple regulation of the overall process in the forward production direction can be carried out. The production process is stable and ensures a uniform quality of the film produced.

A further preferred embodiment of the method for producing the film or sheet (claim 8) is characterized in that the mentioned process parameters are regulated in such a manner that:

- the drive parameter of the driven passing-on roller depends on the web stress in the film or sheet in the cutting region automatically detected by means of the load cell unit, and/or
- the drive parameter in the secondary region depends on the automatically detected sag of the film or sheet in the passing-on region.

In particular, the circumferential speed of the driven passing-on roller and/or also the circumferential speed of a driven winding roller can advantageously be set directly as a function of the numerically detected web stress in the film or sheet in the cutting region or of the detected sag of the film or sheet in the passing-on region.

According to another independent aspect of the invention, an installation for producing a film or sheet from a block material is proposed (claim 9). This can in particular be an installation for producing a film or sheet from a slabstock foam. Furthermore, the installation is preferably designed to carry out a production method as described above. As seen in a production direction of the film or sheet, the installation according to the proposal has at least the following regions:

- a cutting region for cutting the film or sheet, wherein a cutting unit is provided in the cutting region for cutting out, in a splitting-open manner, the film or sheet from the block material which is continuously fed to the cutting region during production,
- a passing-on region adjoining the cutting region and having a driven passing-on roller for conveying the film or sheet out of the cutting region, and
- a secondary region adjoining the passing-on region and intended for further processing of the film or sheet, in particular a winding region for winding the film or sheet into a coil.

In this case, a cutting-region stress prevails in the film or sheet in the cutting region upstream of the passing-on roller, and a secondary stress prevails in the film or sheet in the passing-on region upstream of the secondary region, in particular the winding region. The installation according to the proposal is characterized in that at least one of the following detection units is provided:

(a) a cutting-region detection unit in the cutting region for automatically detecting a parameter representing the cutting-region stress, and/or b) a passing-on region detection unit in the passing-on region for automatically detecting a parameter representing the secondary stress.

Furthermore, the installation according to the proposal is characterized in that a control unit is provided for regulating at least one of the following process parameters on the basis of at least one of the parameters detected according to a) or b):

a drive parameter of the block material, a drive parameter of the driven passing-on roller, and/or a drive parameter in the secondary region for moving the film or sheet for further processing of the film or sheet.

Furthermore, according to a further independent aspect of the invention, a method is proposed for retrofitting an installation for producing a film or sheet from a block material, in particular from a slabstock foam (claim 14). Preferably, the retrofitted installation can be an installation as described above. In any case, the installation has at least the following regions as seen in a production direction of the film or sheet:

a cutting region for cutting the film or sheet, wherein a cutting unit is provided in the cutting region for cutting out, in a splitting-open manner, the film or sheet from the block material which is continuously fed to the cutting region during production, a passing-on region adjoining the cutting region and having a driven passing-on roller for conveying the film or sheet out of the cutting region, and a secondary region adjoining the passing-on region and intended for further processing of the film or sheet, in particular a winding region for winding the film or sheet into a coil.

In this case, a cutting-region stress prevails in the film or sheet in the cutting region upstream of the passing-on roller, and a secondary stress prevails in the film or sheet in the passing-on region upstream of the secondary region, in particular the winding region. The method for retrofitting according to the proposal is characterized in that the installation is equipped with at least one of the following detection units:

a) with a cutting-region detection unit in the cutting region for automatically detecting a parameter representing the cutting-region stress, and/or b) with a passing-on region detection unit in the passing-on region for automatically detecting a parameter representing the secondary stress.

In addition, the method for retrofitting according to the proposal is characterized in that:

the installation is equipped with a control unit in such a manner, or an existing control unit is retrofitted in such a manner that at least one of the following process parameters in the installation can be regulated on the basis of at least one of the parameters detected in accordance with a) or b):

a drive parameter of the block material, a drive parameter of the driven passing-on roller, and/or a drive parameter in the secondary region for moving the film or sheet for further processing of the film or sheet.

According to a further independent aspect of the invention, there is also proposed a system for retrofitting an installation for producing a film or sheet from a block material (claim 15). In particular, this can be a system for retrofitting an installation for producing a film or sheet from a slabstock foam. The system according to the proposal is designed to carry out a method for retrofitting as described above. The system according to the proposal is characterized by at least one of the following detection units:

(a) a cutting-region detection unit for automatically detecting a parameter representing the cutting-region stress in the cutting region, and/or b) a passing-on region detection unit for automatically detecting a parameter representing the secondary stress in the passing-on region.

Furthermore, the system is characterized by:

a control unit which is configured in such a manner, or a communication unit configured to communicate with an existing control unit of the installation in such a manner that at least one of the following process parameters in the installation can be controlled on the basis of at least one of the parameters detected according to a) or b):

a drive parameter of the block material, a drive parameter of the driven passing-on roller, and/or a drive parameter in the secondary region for moving the film or sheet for further processing of the film or sheet.

Both with regard to individual technical features and with regard to the resulting advantages with respect to the proposed installation for producing the film or sheet, as well as with regard to the proposed method for retrofitting an installation for producing a film or sheet, as well as with regard to the proposed system for retrofitting an installation for producing a film or sheet, reference can be made to the preceding detailed explanations of the proposed method for producing a film or sheet from a block material. The individual technical aspects are transferable between the different claims and preferred embodiments in a technically meaningful manner—also across categories.

The dependent claims relate to preferred embodiments, namely claims 11 to 13 in relation to the installation according to the proposal for producing the film or sheet.

A further embodiment of a method for retrofitting an installation for producing a film or sheet from a block material is characterized in that the cutting region detection unit and/or the passing-on region detection unit for automatically detecting a sag of the film or sheet is configured as an optical measuring device, preferably as a laser, more preferably in that the optical measuring device is configured for measuring to the surface of the film or sheet.

A further embodiment of a method for retrofitting is characterized in that the cutting region detection unit and/or the passing-on region detection unit is configured as a load cell unit for automatically detecting a web stress in the film or sheet.

A further embodiment of a method for retrofitting is characterized in that, furthermore, a film thickness sensor is configured in the cutting region, which is designed as an optical measuring device, preferably as a laser, for automatically detecting a thickness of the film or sheet, more preferably in that the film thickness sensor is configured for measuring to the surface of the film or sheet.

Another embodiment of a method for retrofitting is characterized in that the control of the mentioned process parameters is set in such a manner that:

the drive parameter of the driven passing-on roller depends on the automatically detected sag of the film or sheet in the cutting region, and/or the drive parameter in the secondary region depends on the web stress in the film or sheet in the passing-on region, which is automatically detected by means of the load cell unit.

Another embodiment of a method for retrofitting is characterized in that the control of the mentioned process parameters is set in such a manner that:

the drive parameter of the driven passing-on roller depends on the web stress in the film or sheet in the cutting region, which is automatically detected by means of the load cell unit, and/or the drive parameter in the secondary region depends on the automatically detected sag of the film or sheet in the passing-on region.

Another embodiment of a system for retrofitting an installation for producing a film or sheet from a block material is characterized in that the cutting region detection unit and/or the passing-on region detection unit for automatically detecting a sag in the film or sheet is designed as an optical measuring device, preferably as a laser.

Another embodiment of a system is characterized in that the cutting region detection unit and/or the passing-on region detection unit is designed as a load cell unit for automatically detecting a web stress in the film or sheet.

Another embodiment of a system is characterized in that, furthermore, a film thickness sensor for automatically detecting a thickness of the film or sheet is provided as an optical measuring device, preferably as a laser, and more preferably in that the film thickness sensor is configured for measuring to the surface of the film or sheet.

Figure 2:
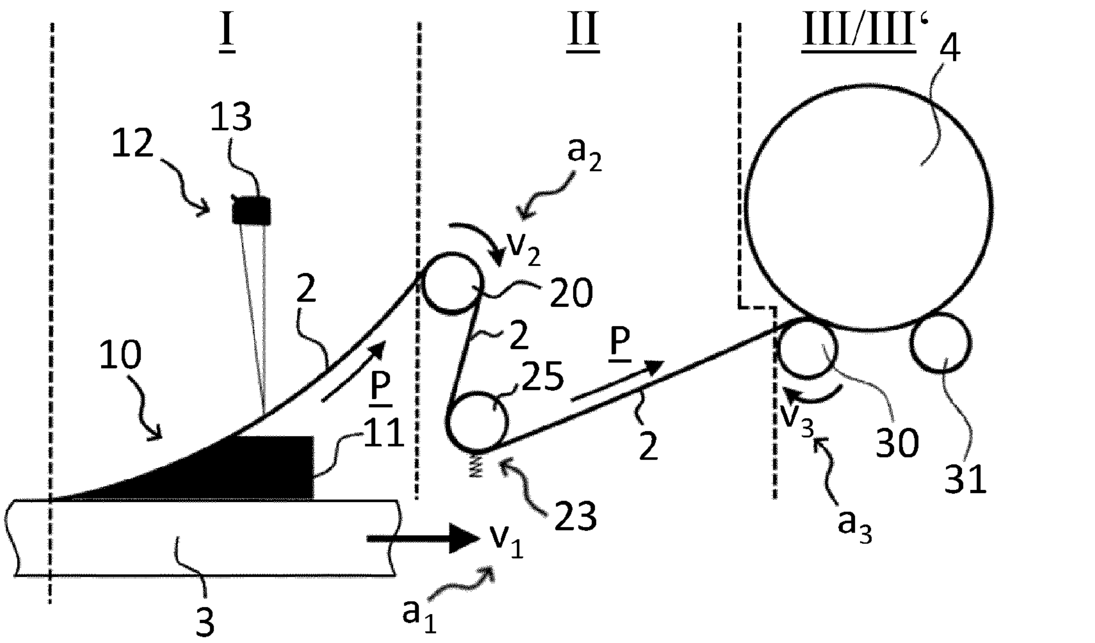
Figure 3:
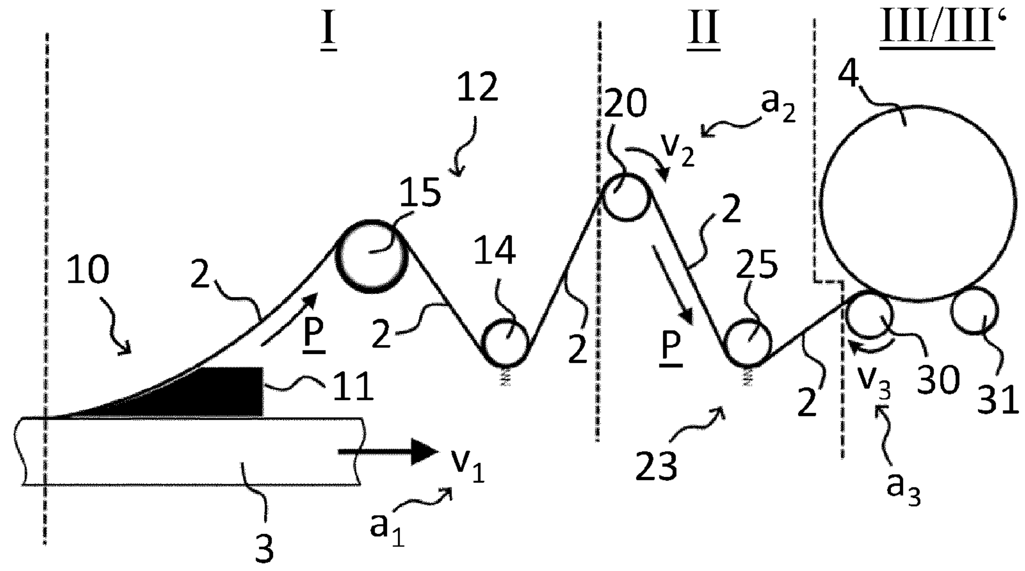
Figure 4:
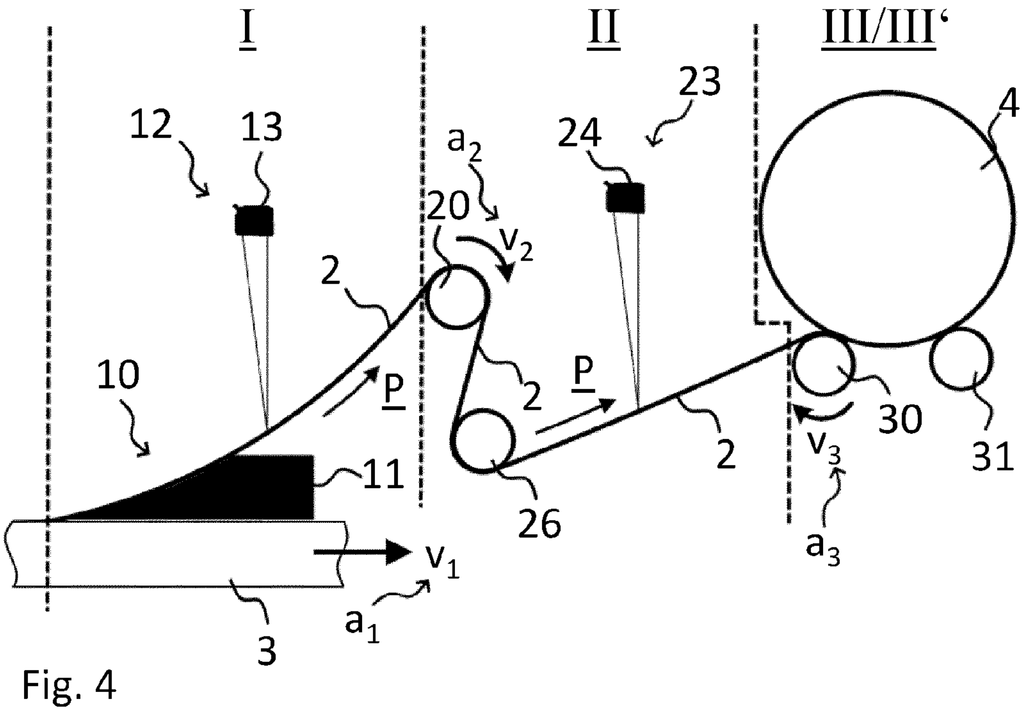
Figure 5:
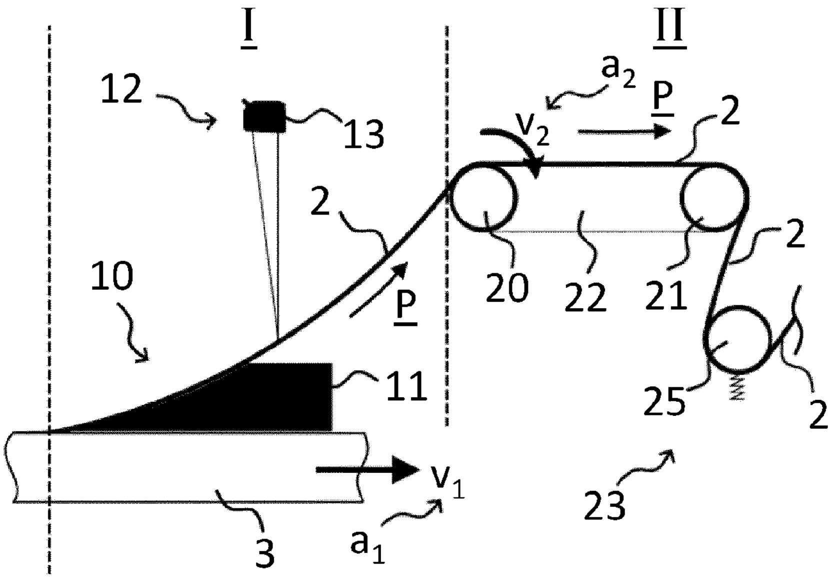
Figure 6:
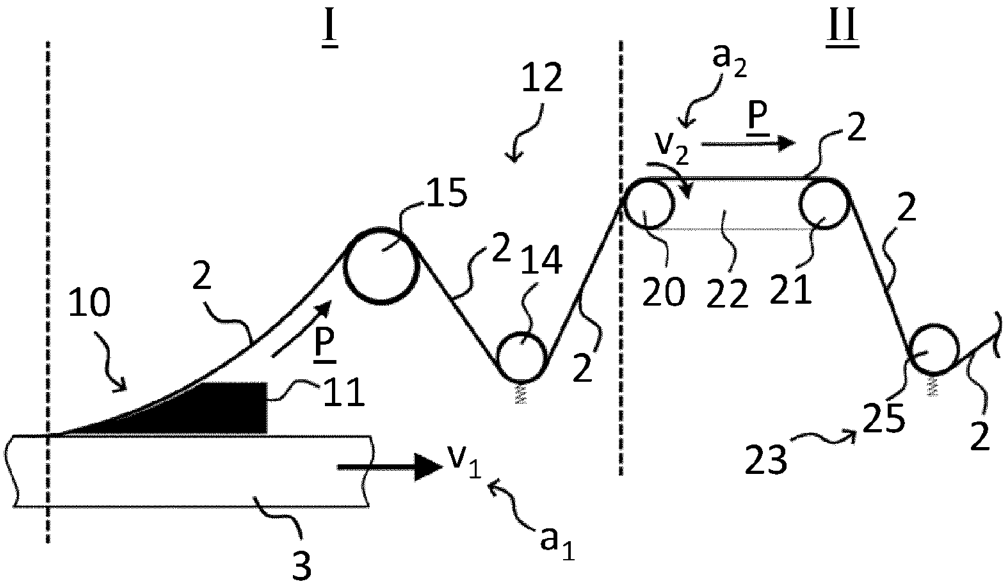

Further advantageous and preferred embodiments are apparent from the following description with reference to the figures. In the drawing, which only shows an exemplary embodiment FIG. 1 shows an entire installation for producing a film from a slabstock foam, FIG. 2 shows a schematic partial view of an installation according to the proposal for producing a film from a slabstock foam according to a first exemplary embodiment, FIG. 3 shows a schematic partial view of an installation according to the proposal for producing a film from a slabstock foam according to another exemplary embodiment, FIG. 4 shows a schematic partial view of an installation according to the proposal for producing a film from a slabstock foam according to another exemplary embodiment, FIG. 5 shows a schematic partial view of an installation according to the proposal for producing a film from a slabstock foam according to another exemplary embodiment, and FIG. 6 shows a schematic partial view of an installation according to the proposal for producing a film from a slabstock foam according to another exemplary embodiment.

FIG. 1 shows an installation 1 for producing a film 2 from a block material, in the present case a slabstock foam 3, which is formed from a soft polyurethane (PUR) foam. Such an installation 1 is basically already known from the prior art. The slabstock foam 3 is conveyed in a circulating manner through the installation 1 at a constant feed rate $v_1$ of approximately 120 m/min. In the view according to FIG. 1, the slabstock foam 3 is conveyed to the right in the lower level of installation 1, deflected by 180° at the right end of installation 1 and, at the top of installation 1, conveyed back in the left direction before being deflected again by 180° at the left edge of installation 1 back into the lower level of installation 1. In this manner, the slabstock foam 1 is conveyed endlessly circulating through the installation 1, essentially until it has been used up and sufficient film 2 has been produced. However, the present invention is not limited to this case. As already explained at the beginning, films can also be cut from a slabstock foam which is not formed to be continuous, i.e. is not glued together, for example. It is also conceivable that a slabstock foam is fed in a reversing manner past a cutting unit for cutting the film. This can be the case, for example, with slabstock foams that are typically 10 m to 60 m long. In such a case, no deflection of the slabstock foam 3 through an installation 1 with multiple levels would then be necessary. The length of the corresponding cut film is then limited to the length of the slabstock foam. However, the cut film can still be wound into a coil or processed further, for example as a stack of sheets.

In the present case, the film 2 produced is wound into a coil 4 in a secondary process. The cutting of the film 2 from the slabstock foam 3 and the winding of the film 2 into the coil 4 takes place in the cutting and winding process, which takes place in subregion A, which is indicated by the dotted box in FIG. 1. The present invention improves the production process of the film 2 and the entire installation 1 in a particular manner in this subregion A. Therefore, the illustrations according to FIG. 2 to FIG. 6 are based on this subregion A and the latter is essentially described below. With reference to the figures, the present invention is explained by way of example, wherein, on the one hand, the method for producing the film 2 and, on the other hand, the installation 1 for producing it are described. Furthermore, the proposed method for retrofitting an installation for producing a film, with which an existing installation can thus be retrofitted in an advantageous manner, as well as the proposed system for retrofitting an installation for producing a film, with which the method for retrofitting can be carried out, also become clear with the aid of the figures.

In this respect, like reference signs in FIG. 1 to FIG. 6 also relate to like technical features so that reference can be made to the preceding description. Explanations of technical features based on the installation 1 or system in question can be applied analogously to the methods according to the proposal and vice versa.

FIG. 2 shows a first embodiment of the installation 1 or the production process according to the proposal, focusing on the cutting and winding process previously indicated by the dotted box in FIG. 1 (subregion A in FIG. 1). FIG. 3 and FIG. 4 show corresponding further embodiments. FIG. 5 and FIG. 6 also relate to further embodiments according to the proposal, wherein only a smaller subregion is illustrated, specifically without showing the subsequent secondary process, which is the winding process in the exemplary embodiments of FIG. 2 to FIG. 4.

In FIG. 2, as well as in FIG. 3 and FIG. 4, as seen in a production direction P of the film 2, first shown is a cutting region I for cutting the film 2 from the slabstock foam 3, as well as a passing-on region II adjoining the cutting region I, and finally, adjoining the passing-on region II, a secondary region III' which in the exemplary embodiments shown in FIG. 2 to FIG. 4 is a winding region III.

The slabstock foam 3 is fed to the cutting region I at the feed rate $v_1$. In doing so, the slabstock foam 3 reaches the cutting unit 10 which in the present case is designed as a cutting wedge 11. The cutting wedge 11 can also be a cutter bar.

The cutting wedge 11 splits off a layer of material from the surface of the slabstock foam 3 so that the film 2 is cut out, in a splitting-open manner, from the slabstock foam 3 by means of the cutting unit 10.

In the cutting region I, a thickness of the cut film 2 can also be automatically detected, which is not shown here. This can be done using an optical measuring device, such as a laser, for example by measuring to the surface of the film. For this purpose, a film thickness sensor, for example in the form of a laser measuring system, can be provided in the region of the cutting unit 10. Advantageously, this optical measuring device can be arranged above the cut film 2 and thus carry out the measurement from above since in this manner, the installation space available in the entire installation 1 can be ideally utilized (see FIG. 1). The measured thickness of the film 2 can serve as an additional automatically detected control variable in order to be able to regularly or continuously check the quality of the film produced.

The cut film 2 is transported further through the cutting region I, which extends to a passing-on roller 20 arranged downstream as seen in the production direction P. The passing-on roller 20 is a driven roller, which is indicated by the curved arrow ($v_2$). The driven passing-on roller 20 is driven by its own drive unit. A drive torque is applied, which ultimately causes the driven passing-on roller 20 to rotate at the circumferential speed $v_2$. The circumferential speed $v_2$ therefore represents a drive parameter $a_2$ of the driven passing-on roller 20. The drive torque is another drive parameter $a_2$. The drive parameter $a_2$ ultimately has a significant influence on the flow of the production process of the film 2 and, as a result, on the quality of the film 2 produced.

The driven passing-on roller 20 serves to convey the film 2 out of the cutting region I. In this respect, the driven passing-on roller 20 also represents the starting point of the passing-on region II. The driven passing-on roller 20 is a rubberized roller, which thus has a contact surface with the passed-on film 2 with an increased coefficient of friction. In this manner, a good separation of the sub-processes can advantageously take place, namely between the cutting region I and the passing-on region II.

As seen upstream in the process, the feed rate $v_1$ as the drive parameter $a_1$ of the slabstock foam 3 also substantially determines the production process of the film 2. The film 2 cut in the cutting region I is also advanced further in the production direction P by the slabstock foam 3, which is continuously moved forwards at the feed rate $v_1$. Because the driven passing-on roller 20, which is designed as a rubberized roller, has a contact surface with a high coefficient of friction, the drive parameter $a_2$ can be set in a desired optimum ratio to the drive parameter $a_1$, or specifically the circumferential speed $v_2$ to the feed rate $v_1$. In this manner, the sub-process taking place downstream of the driven passing-on roller 20, thus taking place starting from the passing-on region II and in particular in the adjoining winding region III (or secondary region III' in general), has no or only a very slight influence on the sub-process in cutting region I. In a particularly advantageous manner, the film 2 can thus be left sagging in cutting region I with virtually no stress. Accordingly, the driven passing-on roller 20 does not pull so strongly on the film 2 in the cutting region I in which the film 2 is just being separated from the block material. As a result, a falsification of the cutting result, for example a thinning of the film 2 actually cut to a desired thickness or even an undesired tearing of the film 2, can be successfully avoided.

As an alternative to the exemplary embodiments shown in FIG. 2 to FIG. 4, the driven passing-on roller 20 can also be part of a pair of rollers which also comprises an auxiliary roller 21. This can be seen in the further exemplary embodiments shown in FIG. 5 and FIG. 6. The film 2 can then be transported further along a longer, circulating conveyor belt 22 and conveyed out of the cutting region I in this manner. The conveyor belt 22 can also optionally have a contact surface with an increased coefficient of friction in order to optimize the separation of the cutting region I from the subsequent regions (passing-on region II, secondary region III').

The secondary region III' is basically configured for further processing of the film 2. Specifically, in the exemplary embodiments shown in FIG. 2 to FIG. 4, the secondary region III' is designed as winding region III for winding the film 2 into the coil 4. The winding unit can be designed as a center winder or also as a surface winder.

In the present case, the winding region III has a driven winding roller 30, which is indicated by the curved arrow ($v_3$). In this respect, the winding roller 30 is driven and provides the circumferential speed $v_3$ as a further drive parameter $a_3$ in the secondary region III' or winding region III, wherein the circumferential speed $v_3$ controls in particular the winding process. In general, the secondary process is controlled by the drive parameter $a_3$ in the secondary region III', wherein the drive parameter $a_3$ in the secondary region III' serves on the one hand to move the film 2 and on the other hand to further process the film 2.

As an alternative to winding the film 2 into the coil 4, other secondary processes are also possible, for example cutting the continuous film 2 into individual film elements or sheets. It is also conceivable for the film 2 to be fed out of the entire installation 1, for example laterally at right angles to the conveying direction corresponding to the direction of the feed rate $v_1$ (see FIG. 1). FIG. 5 and FIG. 6 therefore show exemplary embodiments in which the film 2 is shown broken off at the end of the passing-on region II in order to indicate that various subsequent secondary processes and thus secondary regions III' are possible.

In the exemplary embodiment according to FIG. 2 to FIG. 4, an auxiliary roller 31 is provided in addition to the driven winding roller 30. It is also possible that a winding belt with a driven winding roller is used to implement the winding process.

The winding region III generally starts with the driven winding roller 30, as seen in the production direction P. In general, the secondary region III' always has a unit providing a drive parameter $a_3$, so that with respect to the secondary region III', this secondary region III' starts with the arrangement of the unit exerting the drive parameter as on the film 2, as seen in the production direction P of the film 2.

The present invention can ensure a consistent quality of the produced film 2. In doing so, the operating costs can be reduced by automating the production process and, in particular, by automating the quality control. Thus, on the one hand, it is decisive for the quality of the produced film 2 that the thickness of the film 2 is constant and that no thickness variance occurs or cracks occur in the cut film 2 due to further processing steps, such as the further transport of the film 2 through the installation and ultimately the winding into the coil 4.

The web stress that prevails in the material web in the form of the cut film 2 is of decisive importance here. The cutting-region stress, which corresponds to the web stress in the cutting region I, is therefore very important. It must not be too high in order to successfully avoid cracks in the film 2, for example.

According to the proposal, the production process can therefore be controlled by automatically detecting at least one parameter representing the cutting-region stress in the cutting region I (method step a)).

Furthermore, the web stress in the passing-on region II is of decisive importance, for example for winding the film 2 into the coil 4, this web stress generally being referred to as secondary stress. As an alternative or in addition to the aforementioned control of the production process (method step a)), the method can therefore also be controlled by automatically detecting at least one parameter representing the secondary stress in the passing-on region II (method step b)).

For this purpose, in the present case, a cutting-region detection unit 12 is provided in the cutting region I for automatically detecting a parameter representing the cutting-region stress.

In the exemplary embodiment according to FIG. 2, the cutting region detection unit 12 is configured to automatically detect a sag of the film 2 downstream of the cutting unit 10 and upstream of the driven passing-on roller 20, as seen in the production direction P of the film 2. This sag of the film 2 in the cutting region I serves as a parameter representing the cutting-region stress. The same applies in this respect to the exemplary embodiments according to FIG. 4 and FIG. 5.

The cutting region detection unit 12 according to FIG. 2 (and also according to FIG. 4 and FIG. 5) is designed as an optical measuring device 13, for example as a laser. The optical measuring device 13 detects the sag of the film 2 in the cutting region I from above to the surface of the film 2 as a qualitative measure of how great the web stress acting on the film 2 is in this region.

Similarly, a passing-on region detection unit 23 is also provided in the passing-on region II for automatically detecting a parameter representing the secondary stress.

In principle, the passing-on region detection unit 23 can also be configured for automatically detecting a sag of the film 2 downstream of the driven passing-on roller 20 and upstream of the secondary region III' or winding region III, as seen in the production direction P of the film 2, as shown by way of example in the exemplary embodiment according to FIG. 4. For this purpose, the passing-on region detection unit 23 is designed as an optical measuring device 24, for example as a laser. The optical measuring device 24 can also detect the sag of the film in the passing-on region II by measuring to the surface of the film 2 as a representative qualitative measure of the secondary stress.

The automatic determination of the sag of the film 2 can be carried out in a simple manner by the optical measuring devices 13 and 24, respectively, since the sag of the film 2 is ultimately represented by the current vertical position of the film 2.

The optical measuring devices 13 and 24, respectively, are advantageously arranged above the film 2 and carry out an optical measurement from above to the surface of the film 2, so that the installation space available in the entire installation 1 (see FIG. 1) is effectively utilized.

Alternative detection units can also be used to detect the parameters representing the cutting-region stress or secondary stress. For example, load cell units can advantageously be used to more accurately numerically detect the corresponding value of the web stress.

In FIG. 2, the passing-on region detection unit 23 is designed as such a load cell unit 25. This also applies to the exemplary embodiments in FIG. 3, FIG. 5 and FIG. 6.

In FIG. 3, in turn, the cutting region detection unit 12 is designed as such a load cell unit 14 (also in FIG. 6). In FIG. 3 and FIG. 6, in addition to the load cell unit 14, a deflection roller 15 is also provided in the cutting region I, which is arranged upstream of the load cell unit 14 as seen in the production direction P.

In any case, by means of the load cell units 14 in the cutting region I, the prevailing cutting-region stresses can be precisely measured. In turn, the secondary stresses can be precisely measured by means of the load cell units 25 in the passing-on region II.

Whether by precisely determining the prevailing cutting-region stress or secondary stress or also by indirect qualitative measurement by means of detecting the sag of the film 2, these measured values can advantageously serve as control variables for the overall process in the proposed installation 1.

Both values, i.e. both a parameter representing the cutting-region stress and additionally a parameter representing the secondary stress, can be measured, wherein it is not absolutely necessary to measure both values in order to achieve the advantages of the invention, but one of the two values can also be sufficient.

The measured values then serve as a control variable for controlling the entire production process of the film 2. Thus, at least one of the drive parameters $a_1$, $a_2$, $a_3$ is controlled as a process parameter on the basis of at least one or even both of the measured values (cutting-region stress and parameters representing secondary stress).

Specifically, with regard to the exemplary embodiment according to FIG. 2, it is particularly advantageous if the aforementioned process parameters are controlled in such a manner that the drive parameter $a_2$ of the driven passing-on roller 20 depends the automatically detected sag of the film 2 in the cutting region I. Advantageously, the circumferential speed $v_2$ of the driven passing-on roller 20 can depend on the detected sag. This dependency can be implemented directly. For example, the circumferential speed $v_2$ can be increased if an increase in the detected sag of the film 3 is measured, i.e. if the film 2 sinks in the cutting region I in relation to its vertical position. Conversely, the control is advantageously carried out in such a manner that when the sag decreases, i.e. when the film 2 rises with respect to its vertical position, the circumferential speed $v_2$ is reduced.

Furthermore, with regard to the exemplary embodiment according to FIG. 2, it is particularly advantageous if the aforementioned process parameters are controlled in such a manner that the drive parameter $a_3$ in the secondary region III' depends on the web stress in the film 2 in the passing-on region II, which is automatically detected by means of the load cell unit 25. Advantageously, the circumferential speed $v_3$ of the driven winding roller 30 can depend on the detected secondary stress, i.e. web stress in the film 2 in the passing-on region II. This dependency can be implemented directly, in particular since the web stress is detected numerically via the load cell unit 25. For example, the circumferential speed $v_3$ can be increased if an increase in the secondary stress value is measured. Conversely, the control is advantageously carried out in such a manner that when the secondary stress value decreases, the circumferential speed $v_3$ is increased.

In this manner, on the one hand, a uniform quality of the cut film 2, in particular without thickness variance and without tears, is ensured, and, on the other hand, a wound coil 4 of the desired quality is ensured. A time-consuming permanent inspection, whether by visual inspection or manual inspection of the material web, for which experienced system operators are required, is therefore no longer necessary.

It is particularly advantageous if the unit arranged downstream of the cutting unit 10 as seen in the production direction P of the film 2, such as the driven passing-on roller 20 or the deflection roller 15, is offset upwards with respect to its vertical position relative to the cutting unit 10, as can be seen in all the exemplary embodiments shown (FIG. 2 to FIG. 6).

In addition, when optically detecting the sagging of the film 2 in the passing-on region II, as shown in FIG. 4, it is advantageous if, as seen in the production direction P, a deflection roller 26, which is offset downwards, in particular with respect to the vertical position, relative to the driven passing-on roller 20, is also provided downstream of the driven passing-on roller 20.

In general, it is particularly advantageous that the roller adjoining the driven passing-on roller 20, as seen in the production direction P, is offset downwards with respect to the vertical position, so that greater wrapping of the driven passing-on roller 20 by the film 2 is achieved. Increased wrapping can result in increased friction, whereby better separation of the two regions, namely the cutting region I and the passing-on region II, is achieved. The entire production process of the film 2 is advantageously more decoupled from each other with regard to the different sub-processes of cutting and the subsequent secondary process, so that the sub-processes have less influence on each other.

Furthermore, it is advantageous that, as seen in the production direction P, a roller is arranged upstream of a load cell unit, be it the load cell unit 14 in FIG. 3 or FIG. 6 and/or the load cell unit 25 in FIG. 2, 3, 5 or 6, which is offset upwards with respect to the vertical position. As can be seen in FIG. 2, the driven passing-on roller 20 is arranged above the load cell unit 25 with respect to the vertical position. In FIG. 3, the deflection roller 15 is arranged above the load cell unit 14 with respect to the vertical position, and furthermore, the driven passing-on roller 20 is arranged above the load cell unit 25 with respect to the vertical position. In FIG. 5, and also in FIG. 6, the auxiliary roller 21 is arranged above the load cell unit 25 with respect to the vertical position. Furthermore, in FIG. 6 the deflection roller 15 is arranged above the load cell unit 14 with respect to the vertical position. In this manner, an increased wrapping of the respective load cell unit 14 or 25 by the film 2 is achieved. This results in an increased force transmission between the film 2 and the respective wrapped roller of the load cell unit 14 or 25, which in turn results in a more sensitive detection of the web stresses by the load cell unit 14 or 25. The control and, in particular, regulation of the entire production process of the film 2 can thus be significantly improved.

If the secondary process in the secondary region III' is characterized by a roller which transports the film 2 further, as in the present exemplary embodiments according to FIGS. 2, 4 and 4 in which the winding region III has a driven passing-on roller 30, then it is particularly advantageous if the (middle) driven passing-on roller 20 is offset upwards with respect to the vertical position relative to a connecting line running between this roller of the secondary region III' and the cutting unit 10. As can be seen in FIGS. 2, 3 and 4, the driven passing-on roller 20 is arranged above the connecting line between the cutting unit 10 and the driven winding roller 30 with respect to the vertical position.

This can be particularly advantageous if further units arranged between the driven passing-on roller 20 and the rear roller of the secondary region III', for example the driven winding roller 30, should ever be omitted. For example, it can be desirable or necessary to form a bypass for bypassing these further units of the passing-on region II in order to guide the film 2 directly from the driven passing-on roller 20 to the secondary region III' or the winding region III. The proposed installation 1 is flexible in that it is designed to be adaptable for such a case.

REFERENCE LIST

1 Installation for the production of a film or sheet from a block material
2 film
3 slabstock foam
4 coil
10 cutting unit
11 cutting wedge
12 cutting region detection unit
13 optical measuring device
14 load cell unit
15 deflection roller
20 driven passing-on roller
21 auxiliary roller
22 conveyor belt
23 passing-on region detection unit 23
24 optical measuring device
25 load cell unit
26 deflection roller
30 driven winding roller
31 auxiliary roller
I cutting region
II passing-on region
III winding region
III' secondary region
A cutting and winding process
P production direction of the film 2
$v_1$ Feed rate of the slabstock foam 3
$v_2$ circumferential speed of the driven passing-on roller 20
$v_3$ circumferential speed of the driven winding roller 30
$a_1$ drive parameter of the slabstock foam 3
$a_2$ drive parameter of the driven passing-on roller 20
$a_3$ drive parameter in the secondary region III'

The invention claimed is:

1. A method for producing a film or sheet from a block material, in particular from a slabstock foam, in which at least the following regions are provided, as seen in a production direction of the film or sheet:

a cutting region for cutting the film or sheet, wherein the film or sheet is cut out, in a splitting-open manner, by means of a cutting unit from the block material, which is continuously fed to the cutting region, a passing-on region adjoining the cutting region and having a driven passing-on roller for conveying the film or sheet out of the cutting region, and a secondary region adjoining the passing-on region and intended for further processing the film or sheet, in particular winding region for winding the film or sheet into a coil, wherein there is a cutting-region stress in the film or sheet in the cutting region upstream of the passing-on roller and there is a secondary stress in the film or sheet in the passing-on region upstream of the secondary region, in particular winding region, characterized in that the method is at least partially controlled in such a manner that:

a) at least one parameter representing the cutting-region stress is automatically detected in the cutting region, and/or b) at least one parameter representing the secondary stress is automatically detected in the passing-on region, and in that at least one of the following process parameters is regulated on the basis of at least one of the parameters detected in step a) or b):

a drive parameter ($a_1$) of the block material, a drive parameter ($a_2$) of the driven passing-on roller, and/or a drive parameter ($a_3$) in the secondary region for moving the film or sheet for further processing of the film or sheet.

2. The method according to claim 1, characterized in that as a parameter representing the cutting-region stress, a sag of the film or sheet is automatically detected downstream of the cutting unit and upstream of the driven passing-on roller, as seen in the production direction of the film or sheet.

3. The method according to claim 1, characterized in that as a parameter representing the cutting-region stress, a web stress in the film or sheet is automatically detected by means of a load cell unit downstream of the cutting unit and upstream of the driven passing-on roller, as seen in the production direction of the film or sheet.

4. The method according to claim 1, characterized in that as a parameter representing the secondary stress, a sag of the film or sheet is automatically detected downstream of the driven passing-on roller and upstream of the secondary region, in particular winding region, as seen in the production direction of the film or sheet.

5. The method according to claim 1, characterized in that as a parameter representing the secondary stress, a web stress in the film or sheet is automatically detected by means of a load cell unit downstream of the driven passing-on roller and upstream of the secondary region, in particular winding region, as seen in the production direction of the film or sheet.

6. The method according to claim 1, characterized in that the sag of the film or sheet is automatically detected by means of an optical measuring device, preferably by means of a laser, more preferably by measuring to the surface of the film or sheet.

7. The method according to claim 1, characterized in that the mentioned process parameters are regulated in such a manner that:

the drive parameter ($a_2$) of the driven passing-on roller depends on the automatically detected sag of the film or sheet in the cutting region, and/or the drive parameter ($a_3$) in the secondary region depends on the web stress in the film or sheet in the passing-on region, which is automatically detected by means of the load cell unit.

8. The method according to claim 1, characterized in that the mentioned process parameters are regulated in such a manner that:

the drive parameter ($a_2$) of the driven passing-on roller depends on the web stress in the film or sheet in the cutting region, which is automatically detected by means of the load cell unit, and/or the drive parameter ($a_3$) in the secondary region depends on the automatically detected sag of the film or sheet in the passing-on region.

9. An installation for producing a film or sheet from a block material, in particular from a slabstock foam, wherein the installation has at least the following regions as seen in a production direction of the film or sheet:

a cutting region for cutting the film or sheet, wherein a cutting unit is provided in the cutting region for cutting out, in splitting-open manner, the film or sheet from the block material which is continuously fed to the cutting region during production, a passing-on region adjoining the cutting region and having a driven passing-on roller for conveying the film or sheet out of the cutting region, and a secondary region adjoining the passing-on region and intended for further processing the film or sheet, in particular winding region for winding the film or sheet into a coil, wherein there is a cutting-region stress in the film or sheet in the cutting region upstream of the passing-on roller and there is a secondary stress in the film or sheet in the passing-on region upstream of the secondary region, in particular winding region, characterized in that at least one of the following detection units is provided:

a) a cutting region detection unit in the cutting region for automatically detecting a parameter representing the cutting-region stress, and/or b) a passing-on region detection unit in the passing-on region for automatically detecting a parameter representing the secondary stress, and in that a control unit is provided for regulating at least one of the following process parameters on the basis of at least one of the parameters detected according to a) or b):

a drive parameter ($a_1$) of the block material, a drive parameter ($a_2$) of the driven passing-on roller, and/or a drive parameter ($a_3$) in the secondary region for moving the film or sheet for further processing of the film or sheet.

10. The installation according to claim 9, characterized in that the cutting region detection unit is configured for automatically detecting a sag of the film or sheet or sheet downstream of the cutting unit and upstream of the driven passing-on roller, as seen in the production direction of the film, and/or in that the passing-on region detection unit is configured for automatically detecting a sag of the film or sheet downstream of the driven passing-on roller and upstream of the secondary region, in particular winding region, as seen in the production direction of the film or sheet.

11. The installation according to claim 9, characterized in that the cutting region detection unit is designed as a load cell unit for automatically detecting a web stress in the film or sheet downstream of the cutting unit and upstream of the driven passing-on roller, as seen in the production direction of the film or sheet, and/or in that the passing-on region detection unit is designed as a load cell unit for automatically detecting a web stress in the film or sheet downstream of the driven passing-on roller and upstream of the secondary region, in particular winding region, as seen in the production direction of the film or sheet.

12. The installation according to claim 9, characterized in that the cutting region detection unit and/or the passing-on region detection unit for automatically detecting the sag of the film or sheet is designed as an optical measuring device, preferably as a laser, more preferably in that the optical measuring device is arranged for measuring to the surface of the film or sheet.

13. The installation according to claim 9, characterized in that, furthermore, a film thickness sensor is provided in the cutting region, which is designed as an optical measuring device, preferably as a laser, for automatically detecting the thickness of the film or sheet, more preferably in that the film thickness sensor is arranged for measuring to the surface of the film or sheet.

14. A method for retrofitting an installation for producing a film or sheet from a block material, in particular from a slabstock foam, wherein the installation has at least the following regions as seen in a production direction of the film or sheet:

a cutting region for cutting the film or sheet, wherein a cutting unit is provided in the cutting region for cutting out, in a splitting-open manner, the film or sheet from the block material which is continuously fed to the cutting region during production, a passing-on region adjoining the cutting region and having a driven passing-on roller for conveying the film or sheet out of the cutting region, and a secondary region adjoining the passing-on region and intended for further processing the film or sheet, in particular winding region for winding the film or sheet into a coil, wherein there is a cutting-region stress in the film or sheet in the cutting region upstream of the passing-on roller and there is a secondary stress in the film or sheet in the passing-on region upstream of the secondary region, in particular winding region, characterized in that the installation is equipped with at least one of the following detection units:

a) with a cutting-region detection unit in the cutting region for automatically detecting a parameter representing the cutting-region stress, and/or b) with a passing-on region detection unit in the passing-on region for automatically detecting a parameter representing the secondary stress, and in that:

the installation is equipped with a control unit in such a manner, or an existing control unit is retrofitted in such a manner that at least one of the following process parameters in the installation can be regulated on the basis of at least one of the parameters detected according to a) or b):

a drive parameter ($a_1$) of the block material, a drive parameter ($a_2$) of the driven passing-on roller, and/or a drive parameter ($a_3$) in the secondary region for moving the film or sheet for further processing of the film or sheet.

15. A system for retrofitting an installation for producing a film or sheet from a block material, in particular from a slabstock foam, characterized by:

at least one of the following detection units:

a) a cutting-region detection unit for automatically detecting a parameter representing the cutting-region stress in the cutting region, and/or b) a passing-on region detection unit for automatically detecting a parameter representing the secondary stress in the passing-on region, and characterized by:

a control unit, configured in such a manner, or a communication unit configured to communicate with an existing control unit of the installation in such a manner that at least one of the following process parameters in the installation can be regulated on the basis of at least one of the parameters detected according to a) or b):

a drive parameter ($a_1$) of the block material, a drive parameter ($a_2$) of the driven passing-on roller, and/or a drive parameter ($a_3$) in the secondary region for moving the film or sheet for further processing of the film or sheet.

* * * * *